(12) United States Patent
Hayashi et al.

(10) Patent No.: US 6,312,789 B1
(45) Date of Patent: *Nov. 6, 2001

(54) RECORDING SHEET AND PROCESS FOR THERMALLY FIXING TONER IMAGE FORMED THEREON

(75) Inventors: Masafumi Hayashi; Noritaka Egashira, both of Tokyo-to (JP)

(73) Assignee: Dai Nippon Printing Co., Ltd., Tokyo-to (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,369

(22) Filed: Jan. 27, 1999

(30) Foreign Application Priority Data

Jan. 28, 1998 (JP) ................................. P10-029043

(51) Int. Cl.$^7$ ........................................................ B32B 3/00
(52) U.S. Cl. ............................................. 428/195; 430/48
(58) Field of Search ................................. 428/195, 212, 428/332, 339, 348, 349, 354, 331, 481, 483, 486, 513; 430/99; 427/457

(56) References Cited

U.S. PATENT DOCUMENTS

| | | | |
|---|---|---|---|
| 5,130,189 | * | 7/1992 | Hart ........................ 428/331 |
| 5,484,759 | * | 1/1996 | Suto et al. ................ 503/227 |
| 5,582,902 | * | 12/1996 | Kanbayashi et al. ..... 428/206 |
| 5,853,875 | * | 12/1998 | Toshida et al. .......... 428/349 |

FOREIGN PATENT DOCUMENTS

| | | | |
|---|---|---|---|
| 09152736 | 6/1997 | (JP) | ............... G03G/7/00 |
| 09160278 | 6/1997 | (JP) | ............... G03G/7/00 |
| 09171265 | 6/1997 | (JP) | ............... G03G/7/00 |
| 09218527 | 8/1997 | (JP) | ............... G03G/7/00 |
| 09319131 | 12/1997 | (JP) | ............... G03G/7/00 |

\* cited by examiner

*Primary Examiner*—Bruce H. Hess
*Assistant Examiner*—Michael E. Grendzynski
(74) *Attorney, Agent, or Firm*—Ladas & Parry

(57) ABSTRACT

A recording sheet of the present invention comprises a substrate film, a receptor layer for retaining a toner image and a release layer for releasing the receptor layer from a fixing surface of a fixing means, the receptor layer and the release layer being disposed on at least one side of the substrate film in this order from a position of the substrate film, wherein the release layer contains a release agent having compatibility to toner and releasing ability to the fixing surface. A preferable release agent is wax, particularly wax having a polar group in its molecular structure, such as carnauba wax and candelilla wax. The recording sheet of the present invention can provide a high quality of the toner image with no occurrence of fusion to the fixing surface and cohesive failure of the receptor layer even when the thermal fixing is carried out with no oil supplied to the fixing surface of the fixing means.

18 Claims, 1 Drawing Sheet

RECORDING SHEET AND PROCESS FOR THERMALLY FIXING TONER IMAGE FORMED THEREON

BACKGROUND OF THE INVENTION

1. Field of the Invention

The present invention relates to a recording sheet using toner such as a recording sheet for electrophotography and a process for thermally fixing a toner image formed thereon, and particularly relates to a recording sheet and a process for thermally fixing capable of preventing quality of a toner image from being degraded despite of no oil supplied to a fixing means. The present invention is preferably applicable to a OHP film having a good transparency and a thermally fixing process thereof.

2. Description of the Related Art

In a general electrophotography system, a toner image is formed on a recording sheet by transferring toner, and the toner image is then thermally fixed thereon by heating and pressing by means of a fixing means such as a fixing roller. The fixing roller is generally provided with a mechanism going on applying silicone oil thereto to reduce affinity of the toner to the fixing roller for the purpose of preventing offset of the toner itself.

When the recording sheet is used to form a colored image, and particularly adapted for an OHP(i.e., an over head projector) system, a receptor layer having a good affinity to the toner is generally formed on a plastic substrate film of the recording sheet in order to improve transparency of the toner image. Offset of the receptor layer itself owing to the thermal fixing is also prevented by application of the silicone oil.

A recording sheet for OHP has recently used as a preferable communicative medium on various occasions such as a lecture, a school, a company, an explanatory meeting, an exhibition or the like, and wish for a high quality of an image has grown stronger. Wish for an oil-less fixing system is then growing stronger because of unpleasantness of the silicone oil adhering to the recording sheet for OHP, degradation of the image owing to the silicone oil, an environmental issue or the like.

When a conventional recording sheet for OHP having a receptor layer essentially formed of a low molecular thermoplastic resin is used in the oil-less fixing system, the oil-less fixing system however causes sticking or fusion of the receptor layer of the recording sheet to the fixing roller or cohesive failure of the receptor layer itself, thus involving the recording sheet in deterioration of transparency.

There has been made many proposals for the toner, the recording sheet and the fixing process in order to realize the oil-less fixing process.

Japanese Patent Application Laid-open (KOKAI) Hei 9(1997)-218527 proposes that a receptor layer on a substrate contains a thermoplastic resin and a release agent having a melting point in a range of 40–120° C. It is however difficult for such a proposed recording sheet to prevent cohesive failure of the receptor layer because the thermoplastic resin in the receptor layer is easily softened in order to improve quality of the image.

Japanese Patent Application Laid-open (KOKAI) Hei 9(1997)-171265 proposes that a flow beginning temperature of a binder resin in a receptor layer is set to 0–10° C. higher than that of a binder resin in toner, and an angle made by an inclination of a protruding portion of a toner particle lodges in the receptor layer is set to 40 degrees or less with respect to the receptor layer. Though this prior art discloses that a surface temperature of a fixing roller should be set within a range of 130–160° C., the receptor layer is actually liable to be caused offset in this range of the surface temperature.

Japanese Patent Application Laid-open (KOKAI) Hei 9(1997)-160278 proposes a receptor layer containing a thermoplastic resin and a release agent selected among silicone oil and fluorine type oil. It is however difficult for such a proposed receptor layer to provide a high quality of an image because toner embedded in the receptor layer is not compatible with the release agent.

Japanese Patent Application Laid-open (KOKAI) Hei 9(1997)-152736 proposes a receptor layer containing a thermoplastic resin and a plasticizer. Such a proposed receptor layer is however involved in the same problem of compatibility.

SUMMARY OF THE INVENTION

A first object of the present invention is to provide a recording sheet using toner such as a recording sheet for electrophotography, which is applicable to an oil-less fixing system so as to eliminate problems caused by adhering of a silicone oil such as sticking, glaring reflection and deterioration of image quality, and can also prevent sticking or fusion to a fixing means such as a fixing roller and occurrence of cohesive failure of the receptor layer itself to secure a good transparency of the recording sheet and a high quality of a toner image even when no oil is supplied to the fixing means in the fixing process.

A second object of the present invention is to provide a process for thermal fixing using such a recording sheet with no oil supplied to the fixing means.

A recording sheet according to the present invention comprises a substrate film, a receptor layer for retaining a toner image and a release layer for releasing the receptor layer from a fixing surface of a fixing means, the receptor layer and the release layer being disposed on at least one side of the substrate film in this order from a position of the substrate film, wherein the release layer contains a release agent having compatibility to toner and releasing ability to the fixing surface.

In the present invention, a process for thermally fixing a toner image formed on a recording sheet comprises the steps of;

provinding the recording sheet comprising a substrate film, a receptor layer for retaining a toner image and a release layer for releasing the receptor layer from a fixing surface of a fixing means, the receptor layer and the release layer being disposed on at least one side of the substrate film in this order from a position of the substrate film, wherein the release layer contains a release agent having compatibility with toner and releasing ability to the fixing surface, forming the toner image on an area provided with the receptor layer of the recording sheet, putting a heated fixing surface of a fixing means into press contact with an area having the toner image, and, removing the fixing surface of the fixing means from the area having the toner image.

The recording sheet of the present invention has a layered structure composed of the substrate film, the receptor layer formed on at least one surface side of the substrate film, the release layer formed on outside of the receptor layer and optional layers formed at any positions as required, in which the receptor layer essentially or mainly undertakes a function to receive and fix the toner, while the release layer essentially or mainly undertakes a function to release the recording sheet from the fixing surface of the fixing means with no occurrence of fusion between them though the fixing surface thermally presses the toner image.

According to the present invention, the recording sheet can provide a high quality of the toner image with no occurrence of fusion to the fixing surface and cohesive failure of the receptor layer even when the thermal fixing is carried out with no oil supplied to the fixing surface of the fixing means.

A preferable release agent is wax, particularly wax having a polar group in its molecular structure, such as carnauba wax, candelilla wax or mixture thereof. The wax is excellent in compatibility to the toner and releasing ability to the fixing surface.

It is preferable that the wax has a melting point in a range of 50 to 130° C. With a melting point of the wax in the above range, the wax can be melted at a typical fixing temperature, thus making a smooth releasing.

An amount of the wax is preferably 30% by weight or more, and more preferably 50% by weight or more to a weight of the release layer.

It is preferable to form the release layer from material substantially containing only wax or only wax as the release agent and thermoplastic resin as a binder. Any additive may be incorporated in the release layer nevertheless. As the thermoplastic resin to be incorporated into the release layer, it is preferable to use thermoplastic resin the same as or analogous with that forming the receptor layer, and the use of the same resin as the receptor layer is particularly preferable.

DETAILED DESCRIPTION OF THE PREFERRED EMBODIMENTS

Figure 1:
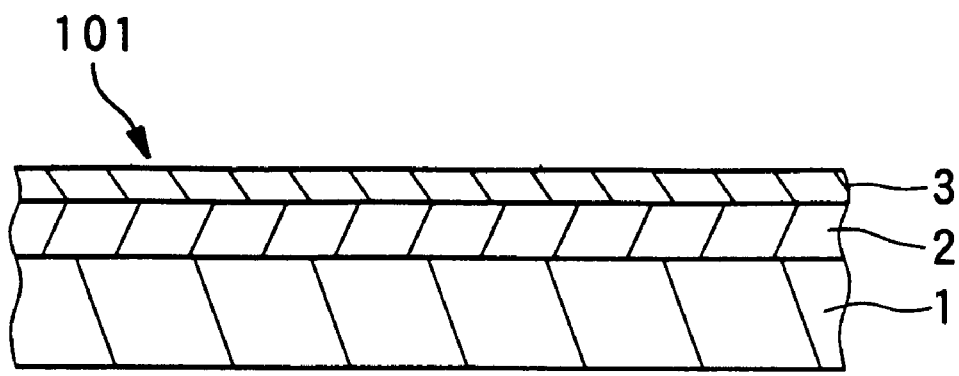
FIG. 1 is a schematically sectional view of one recording sheet according to the present invention.

FIG. 1 shows a layered structure of one recording sheet according to the present invention. In FIG. 1, a recording sheet 101 is constituted of a substrate film 1, a receptor layer 2 for retaining a toner image, and a release layer 3 for releasing the receptor layer from a fixing surface of a fixing means. The receptor layer 2 and the release layer 3 are laid on the front surface of the substrate film in this order from a position of the substrate film.

In the present invention, the recording sheet may be provided with any optional layer, and order of laminated layers including the optional layers is not limited to specific one insofar that the release layer is disposed on out side of the receptor layer when viewing from a position of the substrate film. For example, one or more electrification controlling layers may be between the substrate film and the receptor layer, between the receptor layer and the release layer, on the release layer, or on a back side of the substrate film having no receptor layer. Besides, the receptor layer and the release layer may be laid on each of front and back surfaces of the substrate film in this order from the position of the substrate film.

The recording sheet of the present invention may be subjected to a known printing process using toner such as the electrophotography. A toner image is formed on an area provided with the receptor layer of the recording sheet. After forming the toner image, a fixing surface of a fixing means is put into press contact with an area printed with the toner image. Thus the toner image is fixed in the receptor layer. The fixing surface of the fixing means is then removed from the area having the fixed toner image, thus finishing the process of the thermal fixing.

The recording sheet of the present invention can provide a high quality of the toner image even when the thermal fixing is carried out with no oil supplied to the fixing surface of the fixing means, and it does not show fusion to the fixing surface and cohesive failure of the receptor layer in the fixing process.

(SUBSTRATE FILM)

Various materials may be used as a substrate film of the recording sheet in the present invention. When the recording sheet is such an OHP film as that having a purpose for observing a recorded image by transmitted light, the substrate is preferably formed of thermoplastic resin having good properties in transparency, heat resistance, dimensional stability and stiffness. As specific materials, there may be exemplified films or sheets made of polyethylene terephthalate resin, polycarbonate resin, acrylic resin, polyvinyl chloride resin, polypropylene resin, polystyrene resin, polyethylene resin, cellulose diacetate resin, cellulose triacetate resin or the like having a thickness in a range of 10 to 250 $\mu$m, preferably 50 to 180 $\mu$m. Of these materials, it is preferable to use polyethylene terephthalate resin, polyvinyl chloride resin, polypropylene resin or cellulose triacetate resin in view of the properties pointed above.

When the recording sheet is such an OHP film as that having a purpose for observing a recorded image by transmitted light, it is preferable that the substrate film has. a light transmittance in parallel rays of 70% or more. When the substrate film has a light transmittance of less than 70%, transparency of the recording sheet provided with some layers such as the receptor layer may be deteriorated.

For the purpose of improving adhesion between the substrate film and a layer to be formed thereon, a surface of the substrate film may be subjected to any known adhesiveness-improving treatment such as a primer treatment, a corona discharge treatment or the like.

(RECEPTOR LAYER)

A receptor layer having fixing ability is formed on at least one side of the substrate film. When the recording sheet is applied to the OHP of a full color-electrophotography system, it is preferable to form the receptor layer from resin having an excellent wettability to color toner.

Various thermoplastic resins may be used as resin forming the receptor layer, and there may be exemplified: polyolefine resin such as polyethylene, polypropylene or the like; vinyl resin such as polyvinyl chloride, polyvinylidene chloride, polyvinyl acetate, vinyl chloride-vinyl acetate copolymer, polyacrylate, polystyrene or the like; polyester resin such as polyethylene terephthalate, polybutylene terephthalate or the like; polyamide resin; copolymer of olefin monomers such as ethylene, propylene or the like and the other vinyl monomers; ionomer; cellulose resin such as ethylcellulose, cellulose acetate or the like; polycarbonate resin; and phenoxy resin. Of these thermoplastic resins, it is preferable to use vinyl resin or polyester resin. The resins exemplified above may be used solely or in combination with each other, and resins not exemplified may also be incorporated into the above resins. When two or more resins are mixed to form a receptor layer requiring transparency such as a receptor layer for OHP, it is necessary to select resins having good compatibilities to each other.

A linear polyester resin disclosed in Japanese Patent Application Laid-Open (Kokai) Nos. Hei 7(1995)-219261 has an excellent fixing ability to toner and it is preferably used as material for the receptor layer. This linear polyester resin can be obtained by using modified bisphenol A represented by the following formula (1) as a diol-component, and copolymerizing it with acid-component optionally selected.

FORMULA (1):

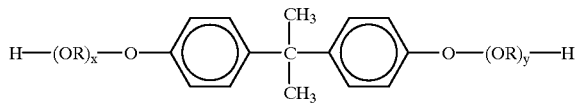

wherein R denotes ethylene or propylene, "x" and "y" denotes integer in a range of 1 to 5 respectively, and a mean quantity of "x" and "y" is in a range of 1 to 3.

The modified bisphenol A represented by the formula (1) can be obtained by modifying bisphenol A with the use of ethylene glycol or propylene glycol. The following formula (2) shows propylene glycol-modified bisphenol A, which is a concrete example of the above modified bisphenol A.

FORMULA (2):

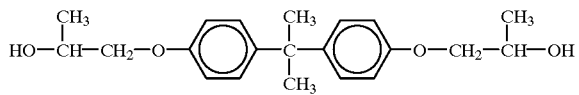

The acid-component for the above linear polyester resin is not limited to specific one, and there may be used, for example, fumaric acid, phthalic acid, terephthalic acid, isophthalic acid, maleic acid, succinic acid, adipic acid, citraconic acid, itaconic acid, sebacic acid, malonic acid, hexacarboxylic acid or the like, as the acid-component.

Among the linear polyester resins described above, it is preferable to use one comprising structural units of propylene glycol-modified bisphenol A represented by the formula (2) as the diol-component and the other structural units of fumaric acid or terephthalic acid as the acid-component because it is good in compatibility to binder resin of toner, and good in fixing ability and wettability to toner to provide an image reproduced well.

It is preferable that thermoplastic resin forming the receptor layer has a number-average molecular weight in a range of 3,000 to 100,000, and more preferably, 3,000 to 50,000. With a number-average molecular weight of less than 3,000, the receptor layer gets liable to adhere to a surface of a fixing means. With a number-average molecular weight of more than 100,000, visibility or sharpness of an image may be deteriorated because of insufficiency in softening of the receptor layer at the time of thermally fixing, and a coating solution forming the receptor layer may be deteriorated in coating fitness because of a high viscosity of the coating solution.

The receptor layer can be formed from coating solution containing the resin described above. The coating solution is prepared by dissolving or dispersing the above resin in a proper solvent. Any additive may be incorporated into the coating solution insofar that functions of the receptor layer such as receiving ability or fixing ability to the toner image are not deteriorated. The thus prepared coating solution may be applied on the substrate film through any known printing method such as gravure printing, silk screen printing or the like or any known coating method such as gravure coating or the like. Thickness of the receptor layer is usually in a range of 0.5 to 10 μm in the dried state.

As additives of the receptor layer, there may be used: inorganic and/or organic fillers which improve conveying fitness of the recording sheet or prevents blocking of stacked recording sheets; and an electrification controlling agent which prevents electrification of the recording sheet or secures a proper density of a recorded image.

The organic filler may be formed from fluorine resin such as tetrafluoroethylene resin, ethylene-tetrafluoroethylene copolymer resin or the like or organic resin such as polyethylene resin, polystyrene resin, acrylic resin, polyamide resin, benzoguanamine resin or the like. Specific example of the inorganic fillers include silica, colloidal silica, alumina, kaolin, clay, calcium carbonate, talc, titan dioxide or the like.

Preferable mean particle size of the filler is in a range of 0.1 to 10 μm, and a mean particle size larger than a thickness of the receptor layer provides a good conveying fitness for the recording sheet. With a mean particle size of the filler less than 0.1 μm, functions of the filler may be insufficient. With a mean particle size of the filler larger than 10 μm, there may be caused undesirable dropping out of an image or deterioration of transparency required in use as the OHP.

Antistatic agents used in an electrification-controlling layer described hereafter may also be used as the electrification-controlling agent for the receptor layer. Any known antistatic agent including cationic, anionic, amphoteric, and nonionic antistatic agent may be incorporated into the receptor layer. There may also be used resin type antistatic agents, which include one obtained by grafting the above described antistatic agent into resin such as acrylic resin or the like and a conductive polymer having π-electron conjugated system such as polyaniline, polythiophene or the like. In addition, there may be used metallic oxide having conductivity such as $SnO_2$, ZnO, $In_2O_3$, Sn-doped $SnO_2$ or the like.

(RELEASE LAYER)

A release layer having releasing ability to a fixing surface of the fixing means is formed on an out side of the receptor layer when viewing from a position of the substrate film. The release layer contains a release agent as an essential component, and it may further contain a binder such as thermoplastic resin and additives as required.

Substance having compatibility to the toner as well as releasing ability to the fixing surface of the fixing means is used as the release agent in the present invention, and it is preferable to use one excellent in such compatibility and releasing ability.

Wax is preferably used as the release agent. Specific example of the wax include the following substances: plant wax such as carnauba wax, candelilla wax, rice wax, sugar cane wax, wax containing phytosterol, Japan tallow or the like; derivatives of the plant wax; mineral wax such as ceresin wax, montan wax or the like; derivatives of the mineral wax such as derivatives of montan wax (e.x., carboxylic acid wax, ester wax and partially saponificated-ester wax); animal wax such as bees wax, spermaceti wax, lanolin or the like; derivatives of the animal wax; petroleum wax such as paraffin wax, microcrystalline wax or the like; derivatives of the petroleum wax; synthesized wax such as polyethylene wax, Fischer-Tropsch wax or the like; and derivatives of the synthesized wax. The examples of the wax also include mixture of the above wax and the following substances: higher fatty acid such as lauric acid, myristic acid, palmitic acid, stearic acid, behenic acid or the like; higher alcohol such as stearyl alcohol, behenyl alcohol or the like; ester such as fatty acid ester of sucrose, sorbitan or the like; or amide such as oleyl amide or the like.

Among various waxes, it is preferable to use one having a polar group or moiety in its molecular structure, such as carnauba wax, candelilla wax or mixture of them. The wax having the polar group or moiety makes a particularly small effect on quality of the toner image, thereby causing almost no deterioration of image quality.

The wax may be mixed with a binder such as thermoplastic resin in order to improve film-forming property. As the thermoplastic resin of the binder, there may be exemplified: polyolefin resin such as polyethylene, polypropylene or the like; vinyl resin such as polyvinyl chloride, polyvinylidene chloride, polyvinyl acetate, vinyl chloride-vinyl acetate copolymer, polyacrylate, polystyrene or the like; polyester resin such as polyethylene terephthalate, polybutylene terephthalate or the like; polyamide resin; copolymer of olefin monomers such as ethylene, propylene or the like and the other vinyl monomers; ionomer; cellulose resin such as ethylcellulose, cellulose acetate or the like; polycarbonate resin; and phenoxy resin.

When the thermoplastic resin is incorporated into the release layer, it is preferable to use thermoplastic resin the same as or analogous with that forming the receptor layer, and the use of the same resin as the receptor layer is particularly preferable. Resins mutually analogous are ones categorized into the same group defined on such a level as polyolefine resin, polyester resin, vinyl resin or the like. Two resins can be categorized into an analogous range if the same functional group or chemical link repeats to extend each main chain of their polymer molecule. For example, when the receptor layer is formed from polyethylene terephthalate, such polyethylene terephthalate or the other polyester resin is preferably used in the release layer, and the polyethylene terephthalate is particularly preferable among various polyesters.

A preferable amount ratio of the wax and the thermoplastic resin expressed in term of "wax/thermoplastic resin" is in a range of 100/0(zero) to 50/50 by weight.

Though it is preferable that the release layer is formed from material substantially containing only wax or only wax and thermoplastic resin, any additive may be incorporated therein. The release layer may contain the above described additives usable for the receptor layer, namely, inorganic and/or organic fillers which improve conveying fitness of the recording sheet or prevent blocking of stacked recording sheets; and electrification controlling agents which prevent electrification of the recording sheet or secure a proper density of the recorded image.

An amount of the wax is preferably 30% by weight or more, and more preferably 50% by weight or more to a weight of the release layer.

When the release layer substantially containing only the wax is formed, the release layer may be formed from a coating solution of an emulsion containing particles of the release agent such as wax particles in which a mean particle size of the release agent is preferably controlled in a range of 0.01 to 1 $\mu$m by the natural sedimentation measure. According to this method, the release layer is formed of the particles of the release agent. A coating liquid prepared by heating and melting the release agent such as the above wax may also be applied on out side of the receptor layer to form the release layer. According to this method, the release layer is homogenous and contains no particle.

When the release layer contains substance other than wax such a thermoplastic resin as substantially contributes to provide a shape to the release layer as well as the wax, the release layer may be formed by applying a coating solution containing the wax, the thermoplastic resin or the like on the out side of the receptor layer through any known printing method such as gravure printing, silk screen printing or the like or any known coating method such as gravure coating or the like.

Whether the release layer is composed of the particles of the release agent or formed of the homogenous structure with no particle, it is preferable that the release agent in the release layer is melted by heating of the fixing process so as to make smooth releasing with no fusion between the recording sheet and the fixing surface of the fixing means which is thermally pressed on the toner image. For this reason, a preferable melting point of the wax as the release agent is in a range of 50 to 130° C. With a melting point of the wax in the above range, the wax can be melted in the fixing process because a temperature of the fixing surface is usually in a range of 140 to 200° C., and the thus melted wax prevents the recording sheet from being fused to the fixing surface by a small affinity of the wax to the fixing surface.

A thickness of the release layer is usually less than 1 $\mu$m, and preferably in a range of 0.05 to 1.0 $\mu$m in the dried state.

(ELECTRIFICATION-CONTROLLING LAYER)

An electrification-controlling layer may be formed at an optional position in a layered structure of the recording sheet of the present invention. That is, one or more electrification-controlling layers can be disposed between the substrate film and the receptor layer, between the receptor layer and the release layer, on an outside position of the release layer, and on a side of the substrate film. opposite to the other side on which the receptor layer is disposed, thereby controlling antistatic ability and electrical resistance of the surface.

The electrification-controlling layer is formed of an antistatic agent solely or mixture of the antistatic agent and a binder resin, and it may be contain any additive as required. Any known antistatic agent including cationic, anionic, amphoteric and nonionic antistatic agent may be used in the electrification-controlling layer. More specifically, there may be exemplified: cationic antistatic agent such as quaternary ammonium salt, derivatives of polyamine or the like; anionic antistatic agent such as alkylphosphate or the like; nonionic antistatic agent such as fatty acid ester or the like. In addition, there may be used resinous type antistatic agent such as a product obtained by grafting the above described antistatic agent into such resin as acrylic resin, or a conductive polymer having π-electron conjugated system. Specific examples of the conductive polymer include sulfonated polyaniline, chemically doped polyacetylene, polyparaphenylenevinylene, polyparaphenylenesulfide, polypyrrole, polythiophene, polyaniline, a product obtained by heat treatment of phenol resin, a product obtained by heat treatment of polyamide, a product obtained by heat treatment of perylenic acid anhydride or the like. In addition, there may be used metallic oxide having conductivity such as $SnO_2$, ZnO, $In_2O_3$, Sn-doped $SnO_2$ or the like.

As the binder resin of the electrification-controlling layer, there may be used, for example, polyester resin, polyurethane resin, polyacrylic resin, polyvinylformal resin, epoxy resin, polyvinyl butyral resin, polyamide resin, polyether resin, polystyrene resin and styrene-acryl copolymer resin.

The electrification-controlling layer can be formed by applying a coating solution containing the antistatic agent on the substrate sheet or any layer of the recording sheet by means of any known coating system such as a gravure coater, a roll coater, a wire bar or the like, and then drying. The coating solution of the electrification-controlling layer can be prepared by dissolving or dispersing the antistatic agent, and further the binder resin and the additives as required, into solvent containing water, for example, a mixture of water and water soluble organic solvent such as methanol, ethanol, isopropyl alcohol or normalpropyl alcohol. The coating solution of the electrification-controlling layer may contain additives to improve fitness for the coating process such as a surface active agent to improve wettability in the coating process or a defoaming agent to suppress bubbles in the coating solution.

A typical electrification-controlling layer is formed by applying a coating solution containing only the ionic or nonionic antistatic agent at a proper concentration on the release layer. Tough the electrification-controlling layer may be formed by coating solution containing the antistatic agent and the binder resin on the release layer, it is better to incorporate the antistatic agent as an electrification-controlling agent into the release layer than to form the electrification-controlling layer containing the binder resin on the release layer because use of the binder resin makes thickness of the electrification-controlling layer large to obstruct the function of the release layer.

Electrical resistance of a front surface and a back surface of the recording sheet, i.e., sheet resistivity of each side can be controlled to a desired value by forming the electrification-controlling layer and/or incorporating the electrification-controlling into the release layer or the other layer.

It is preferable to control a sheet resistivity of the recording sheet in a range of $1.0 \times 108$ to $1.0 \times 10^{14}$ Ω/square. When sheet resistivity of the recording sheet is smaller than $1.0 \times 10^8$ Ω/square, a transferred amount of the toner may get excessively small, thereby resulting in a poor density. On the other hand, when sheet resistivity of the recording sheet is larger than $1.0 \times 10^{14}$ Ω/square, there may be caused scattering of the toner due to electric discharge, thereby resulting in dropping out of the image.

A surface of the fixing means used in the electrophotographic printer or the other printer such as a fixing roller is usually formed of material having releasing ability. More specifically, the following materials can be exemplified: silicone rubber composed of a main chain extended by siloxane linking and side chains of organic substituent such as methyl, phenyl, vinyl or the like, in which Si-moieties provide releasing ability; or fluoro rubber obtained by polymerizing or copolymerizing monomers having fluorine atom, in which F-moieties provide releasing ability. Specific examples of the fluoro rubber include copolymer of ethylene chloride trifluoride and vinylidene fluoride (KEL-F ELASTOMER available from 3M Corporation), copolymer of vinylidene fluoride and propylene hexafluoride (BAYTON available from Du pont Corporation or FROLEL available from 3M Corporation) or the like. Any material having release ability for the fixing surface usually has heat resistance capable of withstanding a temperature of about 150° C. or more.

In the conventional art, even when the fixing surface of the fixing means is formed from the above described material having release ability and heat resistance, thermal fusion is easily caused between the recording sheet and the fixing roller unless the thermal fixing is carried out with oil supplied to the fixing roller. In contrast with this, the recording sheet of the present invention does not cause such a problem.

As described herein before, the recording sheet of the present invention has a layered structure composed of the substrate film, the receptor layer formed on at least one surface side of the substrate film, the release layer formed on outside of the receptor layer and optional layers formed at any positions as required, in which the receptor layer essentially or mainly undertakes a function to receive and fix the toner, while the release layer essentially or mainly undertakes a function to release the recording sheet from the fixing surface of the fixing means with no occurrence of fusion between them though the fixing surface thermally presses the toner image.

The recording sheet of the present invention has an excellent releasing ability to the fixing surface of the fixing means to extent that the thermal fixing of the toner image can be carried out with no problem even when a printer provided with an oil-less fixing system is used. Accordingly, use of the recording sheet and the fixing process of the present invention makes it possible to prevent sticking and glaring reflection of the recording sheet and deterioration of image quality because a releasing oil such as silicone oil does not adhere to the recording sheet. In addition, even when the recording sheet of the present invention is used in the electrophotographic printer provided with an oil-less fixing system, it is possible to prevent deterioration of transparency due to fusion of the recording sheet to the fixing surface of the fixing means or cohesive failure of the receptor layer, thereby obtaining a high quality of the image.

EXAMPLE

Hereinafter, the recording sheet and the process of thermal fixing of the present - invention are concretely described through experimental examples.

Example 1

A substrate film, a coating solution for a receptor layer 1, a coating solution for a release layer 1 and a coating solution for an electrification-controlling layer 1 each having a composition described below were used in the Example 1. The coating solution for the receptor layer 1 was applied on one surface of the substrate film by means of a bar coater to form a receptor layer having a thickness of 3.0 μm in the dried state, and then the coating solution for the release layer 1 was applied on the receptor layer to form a release layer having a thickness of 0.5 μm in the dried state, and still then the coating solution for the electrification-controlling layer 1 was applied on both surfaces of the release layer and an opposite surface of the substrate film to form the electrification-controlling layers showing a surface electric resistibility of $1 \times 10^{11}$ Ω/square in the dried state and in an atmosphere of 23° C. and 50% RH, thus obtaining a recording sheet of the Example 1.

<SUBSTRATE FILM>

Polyethylene terephthalate film having a thickness of 100 μm and a parallel rays transmittance of 92% (LUMIRROR T-60, manufactured by Toray Co., Ltd.)

<COATING SOLUTION FOR RECEPTOR LAYER 1>

| | |
|---|---|
| Polymer of terephthalic acid and ethylene oxide-modified bisphenol A (number average molecular weight: 5,000, grass transition temperature: 65° C.) | 30 parts by weight |
| Silica (mean particle size: 5 μ m) | 0.3 parts by weight |
| Methyl ethyl ketone | 35 parts by weight |
| Toluene | 35 parts by weight |

<COATING SOLUTION FOR RELEASE LAYER 1>

| | |
|---|---|
| Emulsion of carnauba wax (solid component: 40% by weight, melting point: 82° C.) | 20 parts by weight |
| Isopropylalcohol | 60 parts by weight |
| Water | 20 parts by weight |

<COATING SOLUTION FOR ELECTRIFICATION-CONTROLLING LAYER 1>

| | |
|---|---|
| Quaternary ammonium salt of acrylic compound (ELECOND PQ50B, manufactured by Sohken Kagaku Co., Ltd.) | 1 parts by weight |
| Isopropylalcohol | 100 parts by weight |

Example 2

A recording sheet of the Example 2 was obtained in the same manner as that in the Example 1 except that a coating solution for a receptor layer 2 having the following composition was used instead of the coating solution for the receptor layer 1, and then applied by means of the bar coater to form a receptor layer having a thickness of 3.0 μm in the dried state.

<COATING SOLUTION FOR RECEPTOR LAYER 2>

| | |
|---|---|
| Aqueous solution of styrene-acrylic copolymer resin (solid component: 60% by weight, grass transition temperature: 57° C.), (JOHNCRYL J-52, manufactured by Johnson polymer Co., Ltd.) | 50 parts by weight |
| Organic filler (PMMA particles having a mean particle size of 3 μm) | 0.5 parts by weight |
| Isopropylalcohol/water (2/1) | 50 parts by weight |

Example 3

A recording sheet of the Example 3 was obtained in the same manner as that in the Example 1 except that a coating solution for a release layer 2 having the following composition was used instead of the coating solution for the release layer 1 to form a release layer having a thickness of 0.9 μm in the dried state.

<COATING SOLUTION FOR RELEASE LAYER 2>

| | |
|---|---|
| Emulsion of carnauba wax (solid component: 40% by weight, melting point: 82° C.) | 30 parts by weight |
| Emulsion of polyester (solid component: 30% by weight, grass transition temperature: 65° C.) | 10 parts by weight |
| Isopropylalcohol | 40 parts by weight |
| Water | 20 parts by weight |

Example 4

A recording sheet of the Example 4 was obtained in the same manner as that in the Example 1 except that a coating solution for a release layer 3 having the following composition was used instead of the coating solution for the release layer 1 to form a release layer having a thickness of 0.2 μm in the dried state.

<COATING SOLUTION FOR RELEASE LAYER 3>

| | |
|---|---|
| Emulsion of candelilla wax (solid component: 40% by weight, melting point: 68° C.) | 20 parts by weight |
| Isopropylalcohol | 60 parts by weight |
| Water | 20 parts by weight |

Example 5

A recording sheet of the Example 5 was obtained in the same manner as that in the Example 1 except that the following coating material for a release layer 4 was used instead of the coating solution for the release layer 1, and it was melted at 100° C. and then applied by means of a roll coater to form a release layer having a thickness of 1.0 μm in the dried state.

<COATING MATERIAL FOR RELEASE LAYER 4>

| | |
|---|---|
| Rice wax (melting point: 75° C.) | 100 parts by weight |

Example 6

A recording sheet of the Example 6 was obtained in the same manner as that in the Example 1 except that a coating solution for a release layer 5 having the following composition was used instead of the coating solution for the release layer 1 to form a release layer having a thickness of 0.5 μm in the dried state.

<COATING SOLUTION FOR RELEASE LAYER 5>

| | |
|---|---|
| Emulsion of paraffin wax (solid component: 40% by weight, melting point: 60° C.) | 20 parts by weight |
| Emulsion of acrylic resin (solid component: 40% by weight, minimum film-forming temperature: 50° C.) | 10 parts by weight |
| Isopropylalcohol | 50 parts by weight |
| Water | 20 parts by weight |

Example 7

A recording sheet of the Example 7 was obtained in the same manner as that in the Example 1 except that a coating solution for a release layer 6 having the following composition was used instead of the coating solution for the release layer 1 to form a release layer having a thickness of 0.3 μm in the dried state.

<COATING SOLUTION FOR RELEASE LAYER 5>

| | |
|---|---|
| Emulsion of polyethylene wax oxide (solid component: 40% by weight, melting point: 125° C.) | 10 parts by weight |
| Isopropylalcohol | 60 parts by weight |
| Water | 30 parts by weight |

Comparative Example 1

A coating solution for a receptor layer 3 having the following composition was applied on one surface of the same substrate film as that in the Example 1 by means of the bar coater to form a receptor layer having a thickness of 3.0 μm in the dried state, and then electrification-controlling layers were formed on both surfaces of the receptor layer and an opposite surface of the substrate film in the same manner as that in the Example 1, thereby obtaining a recording sheet of the Comparative Example 1.

<COATING SOLUTION FOR RECEPTOR LAYER 3>

| | |
|---|---|
| Aqueous solution of polyester resin obtained by polymerizing diethylene glycol and terephthalic acid (number average molecular weight: 5,000, grass transition temperature: 40° C., solid component: 30% by weight) | 40 parts by weight |

-continued

| | |
|---|---|
| Emulsion of carnauba wax (solid component: 40% by weight, melting point: 82° C.) | 20 parts by weight |
| Silica (mean particle size: 5 μm) | 1 parts by weight |
| Isopropylalcohol | 30 parts by weight |
| Water | 10 parts by weight |

Comparative Example 2

A coating solution for a receptor layer 4 having the following a, composition was applied on one surface of the same substrate film as that in the Example 1 by means of the bar coater to form a receptor layer having a thickness of 3.0 μm in the dried state, and then electrification-controlling layers were formed on both surfaces of the receptor layer and an opposite surface of the substrate film in the same manner as that in the Example 1, thereby obtaining a recording sheet of the Comparative Example 2.

<COATING SOLUTION FOR RECEPTOR LAYER 4>

| | |
|---|---|
| Solution of polyester resin obtained by polymerizing bisphenol A and terephthalic acid (number average molecular weight: 5,000, grass transition temperature: 60° C., solid component: 30% by weight) | 60 parts by weight |
| Solution of silicone-modified acrylic resin (solid component: 20% by weight, grass transition temperature: 60° C.) | 20 parts by weight |
| Silica (mean particle size: 5 μm) | 1 parts by weight |
| Methyl ethyl ketone | 10 parts by weight |
| Toluene | 10 parts by weight |

Comparative Example 3

A recording sheet of the Comparative Example 3 was obtained in the same manner as that in the Example 1 except that the release layer was not formed.

TEST

The recording sheets obtained through the above experimental examples were tested by the method described below to evaluate fitness for the fixing process and image quality.

<FITNESS FOR FIXING PROCESS>

A sample image was recorded on each of the recording sheets of the Examples and the Comparative Examples by means of a self-made laser beam printer which was capable of printing a full color image and provided with an oil-less fixing system to visually observe whether the recording sheet was fused to the fixing roller during the fixing process.

A binder resin of full color toner used for the recording was linear polyester having a number average molecular weight of 5,000, which was obtained by polymerizing fumaric acid and bisphenol A. A fixing temperature was 170° C., and a fixing load was 4 kg/A4 size, and beside, a surface of the fixing roller was formed of "BAYTON" (trade name) available from Du pont Corporation.

Fitness for the fixing process was evaluated on the basis of the following criteria:

○: The receptor layer of the recording sheet was not involved in offset and cohesive failure after the fixing.

X: The receptor layer of the recording sheet was involved in offset or cohesive failure after the fixing.

<IMAGE QUALITY>

A pattern of gradation was printed on each of the recording sheets of the Examples and the Comparative Examples by means of a self-made laser beam printer which was capable of printing a full color image and provided with an oil-less fixing system. The thus obtained printed product was subjected to a OHP projector to evaluate image quality on the basis of the following criteria:

○: A high light portion in the gradational image was clear when observing by transmitted light.

Δ: A high light portion in the gradational image was somewhat gray when observing by transmitted light.

X: A high light portion in the gradational image was dark. when observing by transmitted light.

RESULT OF TEST

Test results of the respective recording sheets are shown in the following Table 1.

TABLE 1

| | Fitness for fixing process | Image quality |
|---|---|---|
| | Examples | |
| 1 | ○ | ○ |
| 2 | ○ | Δ |
| 3 | ○ | ○ |
| 4 | ○ | ○ |
| 5 | ○ | ○ |
| 6 | ○ | ○ |
| 7 | ○ | Δ |
| | Comparative Examples | |
| 1 | X | ○ |
| 2 | X | X |
| 3 | X | ○ |

What is claimed is:

1. A recording sheet comprising a substrate film, a receptor layer for retaining a toner image and a release layer for releasing the receptor layer from a fixing surface of a fixing means, the receptor layer and the release layer being disposed on at least one side of the substrate film in this order from a position of the substrate film, wherein said release layer contains a thermoplastic resin and a release agent, said release agent is at 30% by weight or more of the release layer having compatibility to toner and releasing ability to the fixing surface and said release layer completely covers the receptor layer.

2. A recording sheet as claimed in claim 1, wherein said release agent is wax.

3. A recording sheet as claimed in claim 2, wherein the release layer is formed from wax.

4. A recording sheet as claimed in claim 3, wherein said release layer further contains filler.

5. A recording sheet as claimed in claim 3, wherein said release layer further contains an electrification-controlling agent.

6. A recording sheet as claimed in claim 2, wherein the release layer is formed from mixture of wax and thermoplastic resin.

7. A recording sheet as claimed in claim 6 wherein said release layer further contains filler.

8. A recording sheet as claimed in claim 6 wherein said release layer further contains an electrification-controlling agent.

9. A recording sheet as claimed in claim 2, wherein said wax has a polar group in its molecular structure.

10. A recording sheet as claimed in claim 9, wherein carnauba wax and/or candelilla wax is used as the wax having the polar group.

11. A recording sheet as claimed in claim 2, wherein said wax has a melting point in a range of 50 to 130° C.

12. A recording sheet as claimed in claim 1, wherein the receptor layer comprises a thermoplastic resin that is the same or analogous with the thermoplastic resin of the release layer.

13. A recording sheet as claimed in claim 1, wherein said release layer further contains filler.

14. A recording sheet as claimed in claim 1, wherein said release layer further contains an electrification-controlling agent.

15. A recording sheet as claimed in claim 1, wherein said release layer has a thickness of 1 μm or less.

16. A recording sheet as claimed in claim 1, wherein said substrate film has a light transmittance in parallel rays of 70% or more.

17. A process for thermally fixing a toner image formed on a recording sheet comprising the steps of:

provling the recording sheet comprising a substrate film, a receptor layer for retaining a toner image and a release layer for releasing the receptor layer from a fixing surface of a fixing means, the receptor layer and the release layer being disposed on at least one side of the substrate film in this order from a position of the substrate film, wherein said release layer contains a thermoplastic resin and a release agent, said release agent being present in an amount of at least 30% by weight or more of the release layer, wherein the release layer has compatibility with toner and releasing ability with the fixing surface, and wherein said release layer completely covers the receptor layer;

forming the toner image on an area provided with the receptor layer of the recording sheet;

putting a heated fixing surface of a fixing means into press contact with an area having the toner image; and removing the fixing surface of the fixing means from the area having the toner image.

18. A process for thermally fixing as claimed in claim 17, wherein the thermal fixing is carried out with no oil supplied to the fixing surface of the fixing means.

* * * * *